United States Patent [19]
Greivenkamp, Jr.

[11] Patent Number: 4,575,193
[45] Date of Patent: Mar. 11, 1986

[54] OPTICAL SPATIAL FREQUENCY FILTER

[75] Inventor: John E. Greivenkamp, Jr., Rochester, N.Y.

[73] Assignee: Eastman Kodak Company, Rochester, N.Y.

[21] Appl. No.: 597,290

[22] Filed: Apr. 6, 1984

[51] Int. Cl.⁴ .................. G02B 5/30; H04N 9/097
[52] U.S. Cl. .................... 350/401; 350/403; 358/55
[58] Field of Search ............. 350/404, 407, 403, 408, 350/400, 377, 378, 401, 379; 358/55

[56] References Cited

U.S. PATENT DOCUMENTS

| 3,438,692 | 4/1969 | Tabor | 350/401 |
| 3,531,180 | 9/1970 | Fleisher et al. | 350/379 |
| 3,588,224 | 6/1971 | Pritchard | 350/404 |
| 4,227,208 | 10/1980 | Takanashi et al. | 358/55 |

FOREIGN PATENT DOCUMENTS

| 0094676 | 5/1983 | European Pat. Off. |
| 58-100802 | 6/1983 | Japan |

Primary Examiner—John K. Corbin
Assistant Examiner—Bruce S. Shapiro
Attorney, Agent, or Firm—Thomas H. Close

[57] ABSTRACT

An optical spatial frequency filter of the type having a pair of birefringent elements with means for changing the polarization state of light between them is given a substantially color dependent spatial frequency response. The filter comprises a wavelength dependent means for changing the polarization state of light between the birefringent elements such that the polarization state of light of a first color is changed by a first amount and the polarization state of light of a second color is changed by a second amount sufficiently different from the first amount such that the spatial frequency response of the spatial frequency filter is substantially color dependent. The filter is particularly useful with a color image sensor of the type having a first sampling frequency in a first color and a second sampling frequency different from the first in a second color. The filter is made to have a frequency response in the first and second colors in relation to the respective first and second sampling frequencies of the sensor. The filter has the advantage that, when used with the color image sensor, aliasing is selectively reduced in each color without reducing resolution in the other colors.

10 Claims, 19 Drawing Figures

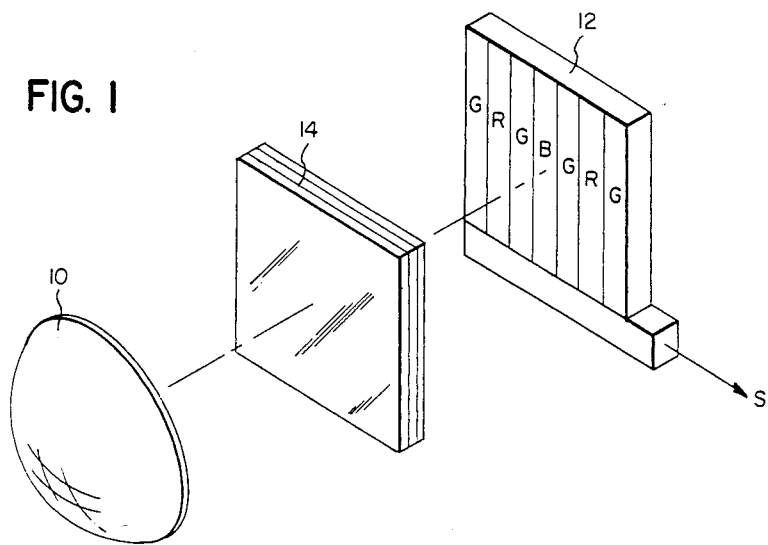
FIG. 1
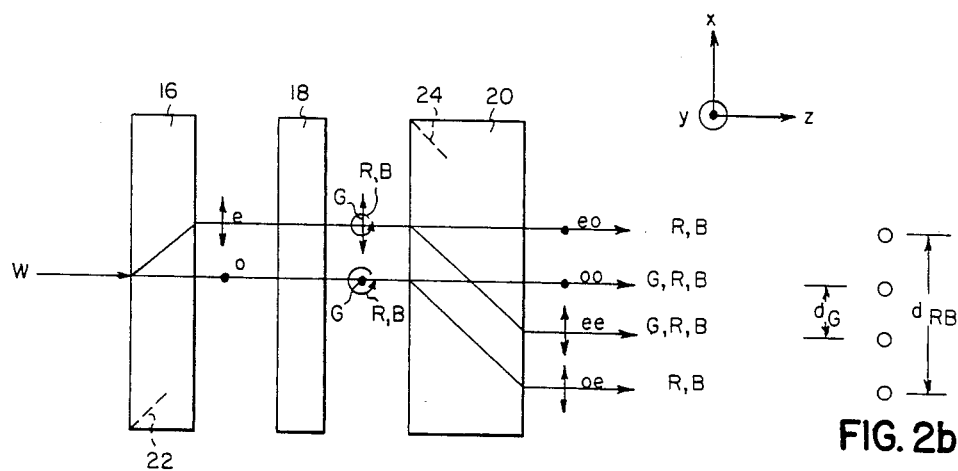
FIG. 2a
FIG. 2b
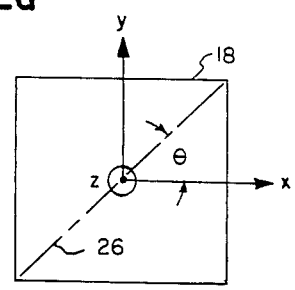
FIG. 3

FIG. 4
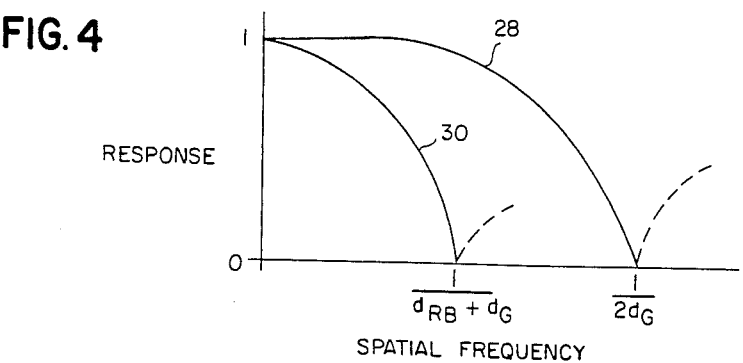
FIG. 5a
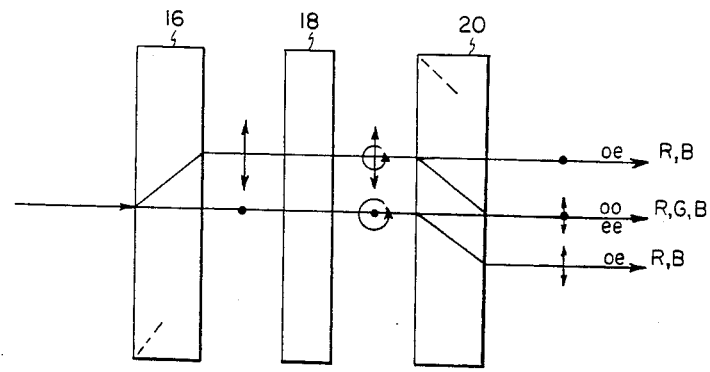
FIG. 5b
FIG. 6a
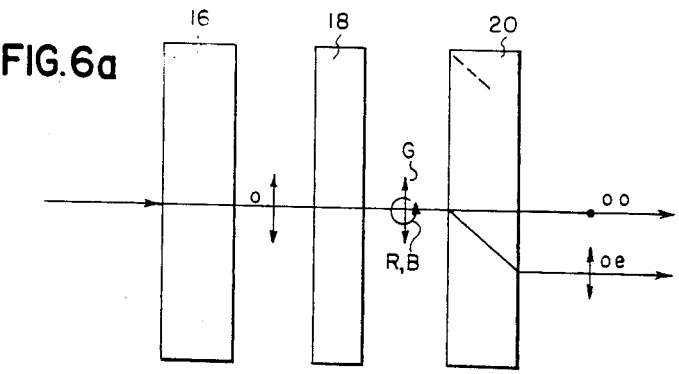
FIG. 6b

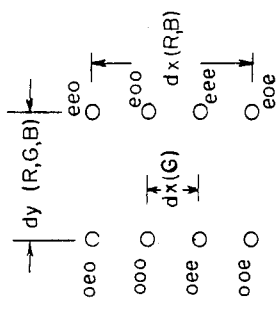
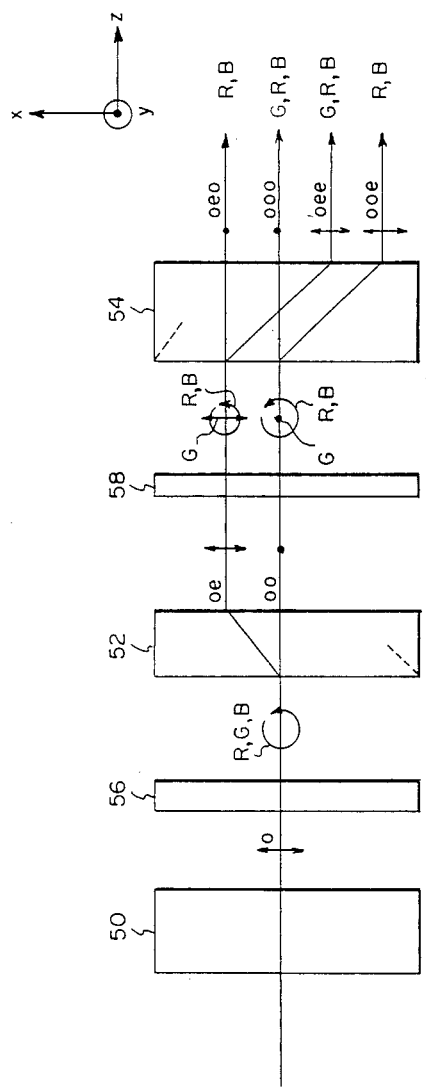
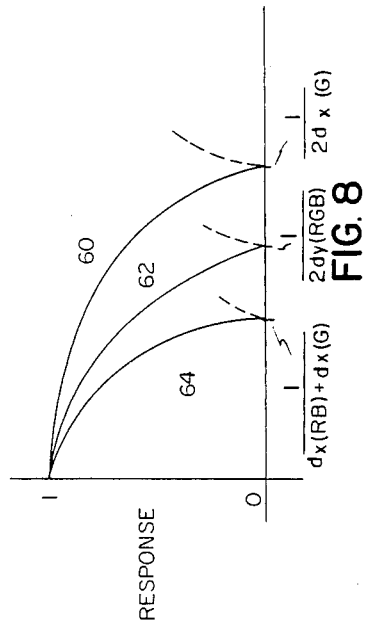
FIG. 7b
FIG. 7a
FIG. 8

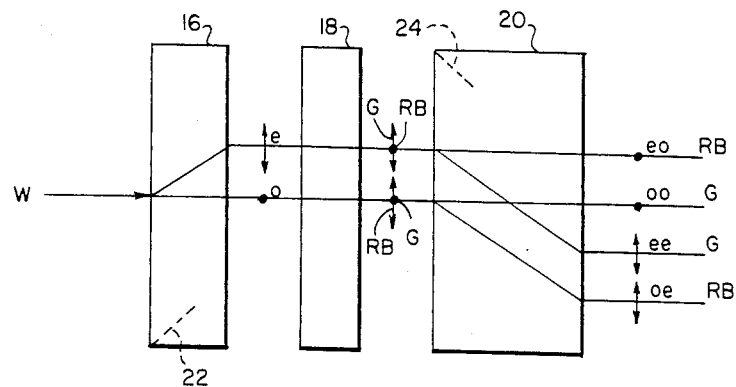
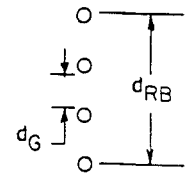
FIG. 9a
FIG. 9b
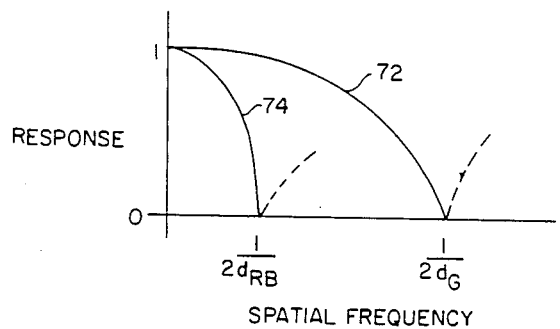
FIG. 10
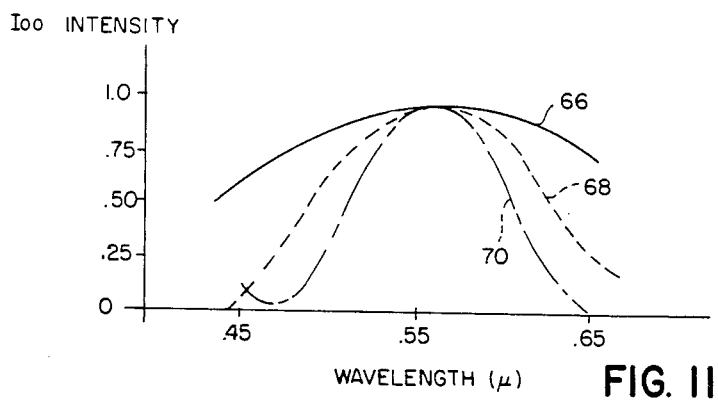
FIG. 11

OPTICAL SPATIAL FREQUENCY FILTER

TECHNICAL FIELD

This invention relates to optical spatial frequency filters particularly for use with discrete sampling image sensors.

BACKGROUND ART

In an image sensing system having an image sensor that samples the image at discrete sampling locations, it is desirable to band limit the spatial frequency of the input image to reduce the appearance of spurious spatial frequency components in an image reconstructed from the signals produced by the image sensor. The production of the spurious spatial frequency components is called aliasing error. The effect occurs when the image includes spatial frequency components that are higher than one-half of the spatial sampling frequency of the sensor. Visual patterns produced by aliasing errors are often called Moire patterns. To this end, it is known to employ an optical spatial frequency filter in the optical path of an image sensing system.

U.S. Pat. No. 3,588,224 issued June 28, 1971 to D. H. Pritchard discloses an optical spatial frequency filter for use with a color TV camera tube having a striped color filter. The optical spatial frequency filter includes at least one pair of birefringent elements with a quarter wave plate positioned between them.

The first birefringent element in the filter splits an incoming ray of light into two spaced apart rays linearly polarized perpendicular to each other. The quarter wave plate changes the polarization state of the light rays from linearly to circularly polarized by retarding one component of the light waves with respect to an orthogonal component by a quarter wavelength. The second birefringent element splits each of the two circularly polarized rays into two spaced apart rays to form an array of four spaced apart rays.

When the optical spatial frequency filter is placed in the optical path of the image sensing system, each spot in the input image is split into four spaced apart spots on the image sensor. The image sensor is presented with four overlapping identical images, each image slightly displaced from the others. The resulting composite image presented to the image sensor appears as a slightly blurred version of the original image, having reduced spatial resolution. In one arrangement of the elements of the spatial frequency filter, the spaced apart spots lie along a line, thereby limiting the spatial resolution in the direction of the line. Alternatively, the elements can be arranged relative to each other to cause the spaced apart spots to lie on the corners of a parallelogram, thereby limiting the spatial resolution in two orthogonal directions. Further birefrengent elements and wave plates may be added to the filter to further modify its frequency response. In other spatial frequency filters of this type, the means for changing the polarization state of the light between the birefringent elements is an optically active element that directly rotates the polarization of the light, rather than retarding one component of it with respect to another.

In some color image sensors, the spatial sampling frequency in one color is different from the spatial sampling frequency of another color. For example, in one type of image sampling system, the spatial sampling frequency in green is twice the spatial sampling frequency in red or blue to account for the greater sensitivity of the human eye to green detail. To date, the spatial frequency filters described above have been built to function in an achromatic fashion, i.e. the spatial frequency response of the filters is substantially the same for all colors.

An achromatic frequency response presents a dilemma for use with a color image sensor where the spatial sampling frequency is higher for one color than it is for another. If the frequency response of the filter is optimally chosen to reduce aliasing in the more highly sampled color (e.g. green), the spatial frequencies in the other less highly sampled colors (e.g. blue and red) will not be adequately limited, resulting in aliasing in these colors. On the other hand, if the frequency response of the spatial filter is optimized for the less highly sampled colors (e.g. red and blue), the spatial frequencies in the more highly sampled color (e.g. green), will be unduly limited, and the sharpness of an image reconstructed from the samples will be undesirably reduced.

DISCLOSURE OF THE INVENTION

It is an object of the invention to provide an optical spatial frequency filter of the type described above, that avoids the drawbacks noted above when used with an image sensor having different spatial sampling frequencies for different colors.

The object is achieved according to the present invention by providing an optical spatial frequency filter having a color dependent spatial frequency response. This is accomplished by a wavelength dependent means for changing the polarization state of the light such that the polarization state of light of a first color is changed by a first amount, and the polarization state of light of a second color is changed by a second amount different from the first, such that the spatial frequency response of the spatial frequency filter is color dependent.

When used with a given image sensor, the respective thicknesses of the elements, and their arrangement relative to each other, are selected so that the spatial frequency response to the first color is related to the sampling frequency of the first color by the sensor, and the spatial frequency response to the second color is related to the sampling frequency of the second color.

The advantages offered by the invention are mainly that the spatial frequency response of the filter is color dependent so that aliasing effects can be reduced in a color image sensing system having an image sensor with different spatial sampling frequencies for different colors without sacrificing resolution in one or more of the colors. Additionally, the color dependent optical spatial frequency filter is easily and inexpensively constructed. It is durable and is easily tailored for different frequency responses in one or two dimensions.

BRIEF DESCRIPTION OF THE DRAWINGS

Ways of carrying out the invention are described below with reference to the drawings, wherein:

FIG. 1 is a schematic perspective diagram of an image sensing system having a color image sensor for sampling different colors at different spatial sampling frequencies;

FIG. 2a is a schematic diagram of a color dependent spatial frequency filter according to the present invention, FIG. 2b is a diagram illustrating the output of the filter of FIG. 2a in response to a spot of unpolarized white light;

FIG. 3 is a diagram useful for showing the orientation of a wave plate in the filter shown in FIG. 2a;

FIG. 4 is a diagram illustrating the color dependent spatial frequency response of the filter shown in FIG. 2a;

FIG. 5a is a schematic diagram of another example of a color dependent spatial frequency filter according to the invention;

FIG. 5b is a diagram illustrating the output of the filter shown in FIG. 5a in response to a spot of unpolarized white light;

FIG. 6a is a schematic diagram of a spatial filter according to the invention, having a two dimensional color dependent frequency response;

FIG. 6b is a diagram illustrating the output of the filter shown in FIG. 6a in response to a spot of unpolarized white light;

FIG. 7a is a schematic diagram of another two dimensional color dependent spatial filter according to the present invention;

FIG. 7b is a diagram illustrating the output of the filter shown in FIG. 7a in response to a spot of unpolarized white light;

FIG. 8 is a diagram illustrating the color dependent spatial frequency response, in different spatial directions, of the filter shown in FIG. 7a;

FIG. 9a is a schematic diagram of another example of a color dependent spatial frequency filter according to the invention;

FIG. 9b is a diagram illustrating the output of the filter shown in FIG. 5a in response to a spot of unpolarized white light;

FIG. 10 is a diagram illustrating the color dependent spatial frequency response, of the filter shown in FIG. 9a;

FIG. 11 is a plot of spot intensity versus wavelength of light useful in describing the operations of the color dependent spatial filter having a full wave plate, or multiple order full wave plate;

WAYS OF CARRYING OUT THE INVENTION

Figure 12B:
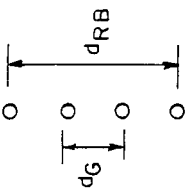
FIG. 12b is a diagram illustrating the output of the filter shown in FIG. 12a in response to a spot of unpolarized white light.

The image sensing system shown in FIG. 1 includes a lens 10 for focusing an image onto a discrete sampling type color image sensor 12, such as a CCD image sensor having an overlying color filter array indicated by vertical stripes labeled GRGB to indicate green, red, green, and blue respectively, and a color dependent spatial frequency filter 14. As shown in FIG. 1, the green filter elements (G) on the color image sensor 12 occur at twice the spatial frequency of the red (R) or blue (B) filter elements. A color dependent spatial frequency filter 14 limits the spatial frequencies in the green component of the input image to frequencies related to the frequency of green filter elements in the array of filter elements on the image sensor 12, and limits the spatial frequencies in the red and blue components of the input image to some lower frequency related to the frequencies of the red and blue filter elements on the image sensor 12. The color dependent spatial filter, thereby reduces aliasing in each color in an image formed from the output signal S of the image sensor, without unnecessarily sacrificing resolution or sharpness in any of the colors of the image.

FIG. 2 shows an exploded top view of the color dependent spatial frequency filter 14. The filter 14 comprises a first birefringent element 16, a wave plate 18, and a second birefringent element 20. The birefringent elements may be constructed from any of the doubly refracting mineral crystals such as calcite or quartz. The wave plate may be constructed from any of the naturally occurring doubly refracting crystals or man-made, oriented plastic materials used for constructing wave plates.

The first birefringent element 16 having an optic axis 22 located parallel to the plane of the drawing as shown in FIG. 2, splits a ray of unpolarized white light W into an "ordinary" ray component (o) polarized in a direction perpendicular to the plane of the drawing, and indicated by a dot, and an "extraordinary" ray component (e) polarized in a direction in the plane of the drawing and perpendicular to the polarization of the "ordinary" ray, indicated by an arrow. The two rays emerge from the birefringent element in a direction parallel to and spaced apart from each other, and parallel to the input ray W. The wave plate 18 changes the polarization state of the red and blue components of the white light rays from linearly polarized to circularly polarized as indicated by the circular arrows labeled R, B, but does not affect the polarization state of the green component of the white light ray, as indicated by the arrow and dot labeled G. This result is achieved because the wave plate has the effect of a quarter wave plate in red and blue, and a full wave plate in green.

A front view of the wave plate 18 is shown in FIG. 3. The wave plate comprises a sheet of birefringent material having an optic axis 26 that lies parallel to the plane surfaces of the sheet, and at an angle $\theta$ to the direction of polarization of the e ray emerging from the first birefringent element 16. In this first embodiment, $\theta = 45°$. The required thickness of such a wave plate can be calculated as explained below, and the wave plate is easily constructed.

The second birefringent element 20, having an optic axis 24 deflects the light polarized in the plane of the drawing, into e rays indicated by the arrows, and passes the light polarized perpendicular to the plane of the drawing into o rays, as indicated by the dots.

The circularly polarized light, having equal components polarized in the plane of the drawing and perpendicular to the plane of the drawing, is equally split into the e and o rays. The light polarized linearly in the plane of the drawing is transmitted on the e ray while the light polarized perpendicular to the plane of the drawing is transmitted on the o ray. Thus, the circularly polarized red and blue components of the input light are equally split into the e and o rays, but the linearly polarized green component is transmitted totally on one or the other of the e or o rays. As a result, the four rays emerging from the second birefringent element 20 are colored.

The top ray labeled eo to indicate that it derives from the e ray out of element 16 and the o ray out of element 20 is colored magenta because of the absence of green light. The bottom ray labeled oe is similarly colored. The two center rays labeled oo and ee respectively are colored green due to the predominance of green light in them.

When the four rays are spaced apart equally as shown in FIG. 2a, and the amount of red and blue light in all four spots is equal, the spatial cutoff frequency of the filter 14 will be twice as high for green as for blue or red. FIG. 2b shows the pattern of colored spots produced by the filter in response to a spot of unpolarized white light.

The distances between the spots and the relative intensity of the spots determine the frequency responses of the filter 14. The distances are controlled by the respective thicknesses of the elements 16 and 20. The relative intensities are controlled by the arrangement of the elements, and the thickness or retardation of the wave plate. The frequency responses of the filter are selected in relation to the spacing of the colored filter elements on the image sensor. The spatial frequency responses are shown schematically in FIG. 4. The line labeled 28 shows the spatial frequency response of the filter to green components of the input image. The green frequency response has a first zero at a spatial frequency equal to $1/2d_G$. Where $d_G$ is the distance between the green colored spots. The line labeled 30 represents the spatial frequency response of the filter to red and blue components of the input image. When the red and blue light is equally divided between the four spots, the red and blue frequency response has a first zero at a spatial frequency of $1/d_{RB}+d_G$ where $d_{RB}$ is the distance between the magenta colored spots. When the spots are equally spaced, $d_{RB}=3d_G$, and the first zero of the frequency response for red and blue is $1/4d_G$.

As noted above, the wave plate 18 between the two birefringent elements is a quarter wave plate for red and blue wavelengths of light, and a full wave plate for green wavelengths of light. A wave plate functions by retarding one component of a light ray with respect to another component, thereby changing the polarization state of the light ray. The retardation of a wave plate of thickness t is given by:

$$\Delta\phi = \frac{2\pi}{\lambda} t(n_e - n_o) \quad (1)$$

where:

$\Delta\phi$ is the relative displacement between orthogonal components of the light ray in radians, $\lambda$ is the wavelength of the light, and $(n_e - n_o)$ is the birefringence of the material.

Although the birefringence is a weak function of wavelength $\lambda$, called the dispersion of the birefringence, this effect is relatively small for most materials and can be safely ignored in first order calculations. The strong function of wavelength provided by the $\lambda$ in the denominator of the right hand side of equation (1) is what enables a wave plate to function as a full wave plate for green and a quarter wave plate for red and blue.

Assuming that the wavelengths of blue, green and red light are $\lambda_B=0.45\mu$, $\lambda_G=0.55\mu$, and $\lambda_R=0.65\mu$ respectively, and choosing a first order full wave plate for green wavelengths of light ($\Delta\phi_G=2\pi$), the effect of the wave plate on red and blue can be calculated.

From equation (1), it is seen that $$\Delta\phi_B = \frac{\lambda_G}{\lambda_B} \Delta\phi_G = 1.22 \times 2\pi \quad (2)$$

and $$\Delta\phi_R = \frac{\lambda_G}{\lambda_R} \Delta\phi_G = .85 \times 2\pi \quad (3)$$

These values are very close to the quarter wave effect desired for red and blue. However, rather than obtaining circularly polarized light, eliptically polarized light is produced. The relative spot intensities can be calculated from the following equations:

$$I_{oe}=I_{eo}=\tfrac{1}{2}(1-\cos(\Delta\phi)) \quad (4)$$

$$I_{oo}=I_{ee}=1-I_{oe} \quad (5)$$

where:

$I_{xy}$ are the relative intensities of the respective spots formed by the rays. Note that the total amount of energy in the pattern is defined to be 2.

For the wavelengths chosen above, these spot intensities are given in Table 1.

TABLE 1

| Wavelengths | $I_{oo} = I_{ee}$ | $I_{oe} = I_{eo}$ |
|---|---|---|
| B (.45μ) | 0.59 | 0.41 |
| G (.55μ) | 1.00 | 0.00 |
| R (.65μ) | 0.79 | 0.21 |

This calculation shows that all the green light is concentrated in the center spots, and the red and blue light is divided between the center and outside spots. While this result is not exactly the ideal result ($I_{oo}=I_{oe}=0.5$) for red and blue, the resulting filter using such a first order full wave plate for $\lambda=0.55\mu$ certainly has the desired characteristics of having a higher frequency response for green than for either red or blue.

FIG. 11 shows some plots of spot intensity versus wavelength of light for the oo spot. The curve labeled 66 is for a first order full wave plate in green. As shown by curve 66 there is a gradual change in relative spot intensity throughout the visible spectrum.

When the dispersion of the birefringence is taken into account for most materials, this result is slightly changed. Further balancing of the red and blue intensities in the spots is achieved by varying the wavelength at which the wave plate is a full wave retarder, and accepting a negligible amount of green in the outside spots.

A color dependent spatial frequency filter of the type described above was constructed for a solid state color image sensor having a color filter stripe pattern like that shown in FIG. 1, with the filter elements spaced on 12μ centers. The birefringent crystals 16 and 20 were quartz slabs 2.30 mm and 4.35 mm thick respectively. These thicknesses were what were on hand in the laboratory at the time the experiment was conducted, more preferably thicknesses of 2.0 and 4.0 mm would be used. The optic axes of the quartz slabs were oriented about 45° to the surface of the slabs as shown in FIG. 2a. The wave plate was a plastic wave plate of laminated cellulose acetate butyrate 0.030 inches thick having first order full wave retardation at 0.53μ. The wave plate material was purchased in a sheet from the Polaroid Corporation under the product designation CAB Laminated Retarders. Alternatively, the wave plate can be manufactured by any of the standard methods of making a first order wave plate (see Chapter 10, page 10-112 of the Handbook of Optics, McGraw Hill (NY), 1978). The elements were oriented as shown in FIGS. 2a and 3, and were clamped together in a fixture and placed in the optical path of the image sensing system. The resulting filter produced four colored spots separated by approximately 13μ, with 40μ overall spacing between the eo and oe spots. Images produced by the image sensing system were observed to have substantially less aliasing in all three colors than images produced by the same system without the color dependent spatial filter. There was no noticeable loss of resolution in any color.

In production quantities, the elements for manufacturing the filter can be produced inexpensively. The filters are simply constructed by stacking the elements in the proper orientation and securing them together with an index matching optical cement. The resulting structure is rugged and easily handled.

In the example described above, birefringent element 20 is twice as thick as element 16, yielding equal separation between the four output rays. The relative spacing of the spots can be altered by varying the relative thicknesses of the birefringent elements 16 and 20. For example, if element 20 is made the same thickness as element 16, as shown in FIG. 5a, the pattern of three spots shown in FIG. 5b is produced. As just described, the red and blue intensity of the center spot would be twice that of the side spots in the pattern shown in FIG. 5b. The arrangement of the elements can be modified so that the intensity of the red and blue light in the three spots is equal, as follows.

The intensities of the spots can be calculated from the equations.

$$I_{oo} = I_{ee} = 1 - 2\sin^2\theta\cos^2\theta(1 - \cos\Delta\phi_{RB}) \quad (6)$$

$$I_{oe} = I_{eo} = 2\cos^2\theta\sin^2\theta(1 - \cos\Delta\phi_{RB}) \quad (7)$$

where:
$\theta$ is the angle between the fast axis (the optic axis) of the wave plate and the direction of polarization of the e ray from the first birefringent element 16 as shown in FIG. 3, and $\Delta\phi_{RB}$ is the retardation of the wave plate for red and blue wavelengths of light.

Equations (6) and (7) are valid for any combination of thicknesses of birefringent elements 16 and 20, that are oriented to produce a linear array of output spots. Equations (4) and (5) are simplifications of these equations assuming that $\theta = 45°$.

For the intensity of the red and blue light in the center spot to be equal to the intensity of the red and blue light in either of the outside spots, either $\theta$ or $\Delta\phi_{RB}$, or both are varied such that $$I_{eo} = I_{oe} = I_{oo} + I_{ee} \quad (8)$$

for the red and blue components. From equations (6) and (7), this will be true if $$\sin^2 2\theta (1 - \cos \Delta\phi_{RB}) = 4/3 \quad (9)$$

An example solution is immediately found by holding $\theta$ constant $$\theta = 45°; \Delta\phi_{RB} = 2\pi m \pm 1.91 \text{ rad}, \quad (10)$$

where m is an integer. Of course, other solutions can also be found from equation (9). In order to obtain a single spot in green, the condition that $\Delta\phi_G$ be $2\pi m$ must also hold.

Thus, by rotating or changing the retardation of the wave plate, the intensity of colors of light in the spots can be varied. This is true in general for any of the embodiments disclosed herein. Because of the symmetry of the elements, pairs of spots will have equal intensity.

Up to this point, the wave plate 18 has been described as a first order full wave plate for green. Higher order full wave plates may also be employed in the practice of the invention. As the order of the wave plate for green is increased however, the change in relative intensity versus wave-length for the spots increases. As noted above, the curve labeled 66 in FIG. 11 shows the change in relative intensity of the oo spot versus wavelength for a spatial filter having a first order ($\Delta\phi_G=2\pi$) full wave plate in green 18. The curve labeled 68 shows the change in relative intensity for a second order full wave plate in green ($\Delta\phi_G=4\pi$). The curve labeled 70 shows the change in relative intensity for a third order full wave plate in green ($\Delta\phi_G=6\pi$). Comparing the curves 66, 68 and 70, it is seen that as the order of the wave plate increases, the relative intensities of light in the oo spot becomes a stronger function of wavelength. At orders above three, the function undergoes oscillations in the visible wavelengths. This phenomenon is just starting to become evident in the blue wavelengths for the third order wave plate evidenced by the inflection in the curve labeled 70 near 0.46μ. To avoid such oscillations, the order of the wave plate should be less than four.

In the examples described thus far, the rays produced by the color dependent spatial frequency filters have been arranged along a line. If one of the birefringent elements 16, 20 is rotated 90° with respect to the other, the spots will be arranged in a rectangular pattern as shown in FIG. 6b. If the birefringent elements 16 and 20 are of the same thickness, as shown in FIG. 6a, the pattern will be square. With this arrangement, the spatial frequency response of the filter can be tailored to be different for different colors in different directions. This type of spatial filter is useful for example with an image sensor having different sampling frequencies in two orthogonal directions along the sensor. If this filter is rotated so that the oe and eo spots lie on a horizontal line, a diamond shaped pattern is produced. Green is blurred in the horizontal direction only, and red and blue are blurred in both the horizontal and vertical directions. It is noted that with the birefringent elements rotated 90° with respect to each other, at the second birefringent element 20, the o ray from the first birefringent element 16 becomes an e ray; and the e ray from the first element becomes an o ray with respect to the second birefringent element. As shown in FIG. 6a, only the o ray from the first birefringent element 16 is shown. The e ray lies directly beneath the o ray and is not shown. Similarly, only the oo and oe rays emerging from birefringent element 20 are shown. The eo and ee rays lie respectively beneath the oo and oe rays and are not shown. If the angle between the birefringent elements is rotated to an angle other than a multiple of 90°, a parallelogram pattern is produced, and green light will be in all four spots.

The frequency response of the color-dependent, spatial frequency filter according to the present invention can be further refined by adding more wave plates and birefringent elements. FIG. 7a shows an example of a two dimensional color dependent, spatial frequency filter for producing the pattern of colored spots shown in FIG. 7b in response to a ray of unpolarized white light W. The spatial filter comprises three birefringent elements 50, 52, and 54, and two wave plates 56 and 58 sandwiched between the birefringent elements as shown. The first birefringent element 50 splits an unpolarized ray of white light into an o ray and an e ray. In the view shown in FIG. 7a, the first birefringent element 50 is oriented so that the e ray lies directly beneath the o ray, and is not visible in the figure. Wave plate 56 is a first order quarter wave plate in all colors. For this purpose, a first order quarter wave plate at the green wavelength $\lambda_G=0.55\mu$ will suffice, since equation (1) shows that the difference in retardation between the red, green and blue wavelengths at $\Delta\phi_G=\pi/2$ is so small that it can be neglected. The quarter wave plate 56 changes the polarization state of all the colors in both the e and o rays to circular polarization as indicated by the circular arrow labeled R, G, B.

Birefringent element 52 splits each circularly polarized ray into an e ray and an o ray polarized perpendicular to each other as indicated by the dot and arrow in FIG. 7a. Only the oe and oo rays are shown in FIG. 7a, the ee and eo rays lying directly beneath the oe and oo rays respectively. Wave plate 58 is a full wave plate in green and a quarter wave plate in red and blue as described above, and changes the polarization state of the red and blue components of light to circular polarization, without affecting the polarization state of the green light. Birefringent element 54 splits each of the four rays into an e ray and an o ray. All the green light is shifted into the four inside spots ooo, oee, eoo, and eee. The red and blue light is equally shared in the eight spots shown in FIG. 7b.

FIG. 8 is a schematic diagram showing the frequency response of the filter shown in FIG. 7a to the different colors of light in the different directions. The line labeled 60 shows that the frequency response of the spatial filter has a first zero in the x direction for green colors of light at a spatial frequency of $\frac{1}{2}d_{x(G)}$. The line labeled 62 shows that the frequency response of the spatial frequency filter has a first zero for all colors of light in the y direction at a spatial frequency of $\frac{1}{2}d_y(RGB)$. The line labeled 64 shows that the frequency response of the spatial frequency filter has a first zero for red and blue colors of light in the x direction at a spatial frequency corresponding to $1/d_x(G)+d_x(RB)$.

As noted previously, higher order wave plates for green are useful in the present invention. FIG. 9a shows a color dependent optical spatial frequency filter having a higher order full wave plate 18 for green. As shown in FIG. 9a, most of the red and blue light appears in the eo and oe spots with the higher order wave plates. From equation (1), it is seen that when the wave plate is a second order, full wave plate for green ($\Delta\phi_G=4\pi$); it is very nearly a one-half wave plate for blue ($\Delta\phi_B=4.8\pi$) and between a one-half wave plate and a quarter wave plate for red ($\Delta\phi_R=3.38\pi$). When the wave plate is a third order wave plate for green ($\Delta\phi_G=6\pi$), it is almost exactly a one-half wave plate for red ($\Delta\phi_R=5.07\pi$) and not as nearly a one-half wave plate for blue ($\Delta\phi_B=7.3\pi$). When the wave plate is nearly a one-half wave plate in red and blue, and oriented at $\theta=45°$, the polarization of the red and blue light is rotated by about 90° from the polarization of the green light, as shown by the arrows and dots on the rays emerging from the wave plate 18 in FIG. 9a. As a result, the red and blue light is nearly totally separated from the green light in the second birefringent element 20.

Table 2 below shows the relative spot intensities when $\Delta\phi_G$ is $4\pi$ and $6\pi$.

TABLE 2

| $\lambda$ | $\Delta\phi_G = 4\pi$ | | $\Delta\phi_G = 6\pi$ | |
|---|---|---|---|---|
| | $I_{oo}$ | $I_{oe}$ | $I_{oo}$ | $I_{oe}$ |
| B (.45μ) | 0.03 | 0.97 | 0.25 | 0.75 |
| G (.55μ) | 1.00 | 0.00 | 1.00 | 0.00 |
| R (.65μ) | 0.32 | 0.68 | 0.01 | 0.99 |

FIG. 9b shows the spot pattern produced by the color dependent spatial frequency filter shown in FIG. 9a. FIG. 10 is a schematic diagram showing the frequency response of the filter of FIG. 9a to different colors. The line labeled 72 shows that the frequency response to green components of the image has a first zero at a spatial frequency of $\frac{1}{2}d_G$, where $d_G$ is shown in FIG. 9b as the distance between the two center spots. The line labeled 74 in FIG. 10 shows that the frequency response to red and blue components of the image has a first zero at $\frac{1}{2}d_{RB}$, where $d_{RB}$ is shown in FIG. 9b as the distance between the two outside spots.

In the embodiments and examples discussed so far, the wave plate placed between the birefringent elements has been described as a first-order or multiple-order full wave plate for green. Another class of solution to the problem of producing a color dependent spatial frequency filter makes use of a half wave plate in green. In this case, the retardation in green $\Delta\phi_G=2\pi m\pm\pi$, where m is an integer.

Figure 12A:
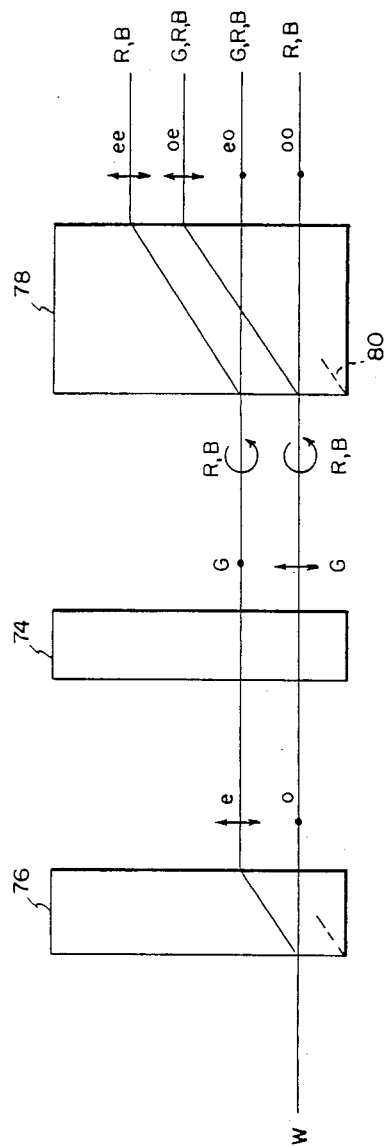
FIG. 12a is a schematic diagram of a further example of a color dependent spatial frequency filter according to the present invention.

FIG. 12a shows an exploded top view of a color dependent spatial frequency filter which uses a half wave plate in green. The wave plate 74 is oriented at $\pi=45°$ between the birefringent elements 76 and 78. The wave plate 74 is a half wave plate for green and a quarter wave plate for red and blue. For green, the wave plate 74 rotates the plane of polarization by 90° so that the o-ray from the first birefringent element 76 becomes an e-ray in the second element 78 and vice versa. For red and blue light, the wave plate 74 turns the input linear polarization into circular polarizations, causing four output spots to be produced by the second birefringent element 78.

The output pattern produced by this filter (shown in FIG. 12b), is the same as that produced by the filter shown in FIG. 2a. In this embodiment, however, the second birefringent element has been rotated by 180° from the earlier situation (note position of optic axis 80). The center two spots in the pattern are formed by the oe and eo rays as opposed to the oo and ee rays in FIG. 2b. For equal intensity red and blue spots, the spatial frequency response of this filter is the same as that shown in FIG. 4.

Equations (6) and (7) are valid for calculating the spot intensities for a linear array of spots produced by this filter. Useful values of the retardation of green include $\Delta\phi_G=\pi$, $3\pi$ and $5\pi$. Table 3 below shows the relative spot intensities for these values of $\Delta\phi_G$.

TABLE 3

| $\lambda$ | $\Delta\phi_G = \pi$ | | $\Delta\phi_G = 3\pi$ | | $\Delta\phi_G = 5\pi$ | |
|---|---|---|---|---|---|---|
| | $I_{oo}$ | $I_{oe}$ | $I_{oo}$ | $I_{oe}$ | $I_{oo}$ | $I_{oe}$ |
| B (.45μ) | 0.12 | 0.88 | 0.75 | 0.25 | 0.97 | 0.03 |
| G (.55μ) | 0.00 | 1.00 | 0.00 | 1.00 | 0.00 | 1.00 |
| R (.65μ) | 0.06 | 0.94 | 0.44 | 0.56 | 0.87 | 0.13 |

Figure 13:
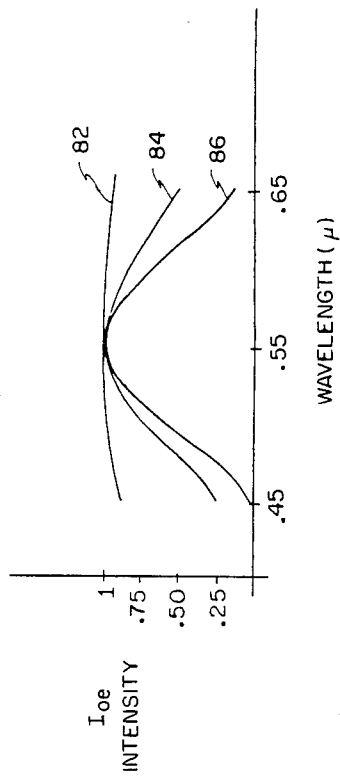
FIG. 13 is a plot of spot intensity versus wavelength of light, useful in describing the operation of the color dependent spatial filter having a half wave plate, or multiple order full wave plate.

The variation of the intensity of the center two spots $I_{oe}$ with wavelength is shown in FIG. 13, where curve 82 is for $\Delta\phi_G=\pi$, curve 84 for $\Delta\phi_G=3\pi$ and curve 86 for $\alpha\phi_G=5\pi$.

It is interesting to note in comparing FIG. 13 to FIG. 11, (the center spot intensity for the full wave plate examples) that curve 82 lies above curve 66, curve 84 lies between curves 66 and 68, and curve 86 is located between curves 68 and 70. The six curves presented in FIGS. 11 and 13 show the first six solutions for producing only two green spots while having significant red and blue light in the third and fourth spots. As the retardation is increased, more red and blue light appears in the outer spots of the pattern.

As with the filters employing full wave plates, various one- and two-dimensional patterns can be produced with a filter containing a half-wave plate. If the angle between the two birefringent crystals is something other than a multiple of 90°, a parallelogram pattern is produced. However, in the case with a half wave plate, it is possible to orient the retarder so that green light appears in only two of the four spots, since a half-wave plate oriented at $\theta$, rotates the plane of polarization of the light by $2\theta$. Orientation of the retarder at an angle other than 45° will also change the amount of red and blue light in the four spots. Patterns with more than four spots can also be produced by adding more wave plates and birefringent elements.

In addition to the means discussed for providing a change in polarization state, namely wave plates constructed from doubly refracting crystals or man-made, oriented plastic materials, several other means will produce the same or similar effects. Other materials, such as liquid crystals, exhibit birefringence and could be used as the wave plate between the two crystals. Another optical effect called optical activity, can also provide a suitable means for changing the polarization state between the crystals. As linearly polarized light propagates through an optically active material, its plane of polarization is rotated. The total rotation is $$\beta = \frac{\pi l}{\lambda}(n_L - n_R) \tag{11}$$

where $n_L$ and $n_R$ are the indices of refraction for left and right handed circularly polarized light and t is the thickness of material. The $1/\lambda$ dependence of the rotation will, as with the wave plates, change the polarization state of light differently for different colors, and can be used to produce a color dependent spatial filter. The situation that is analogous to the full wave plate for green light would have a piece of optically active material whose thickness is appropriate for rotating the plane of polarization of green light by 180°, and that of red and blue light by 180°±45°. Two common optically active materials are crystalline quartz (for light propagating along its optic axis) and cholesteric liquid crystals.

Other materials useful for changing the polarization state are electrically activated materials such as liquid crystals and electro-optic materials that exhibit birefringence and/or optical activity under the influence of an applied field. Electro-optic materials include KDP (potassium dihydrogen phosphate) and PLZT (lead zirconate titanate). With such materials, the spatial frequency response of the color dependent spatial frequency filter can be changed by changing the voltage across the electro-optic material.

INDUSTRIAL APPLICABILITY

A color dependent optical spatial frequency filter has been described. The spatial frequency filter is particularly useful for limiting input spatial frequencies to color image sensors having different sampling frequencies in different colors to reduce aliasing in one color without reducing resolution in another color. The color dependent spatial frequency filter has the further advantages of being inexpensive and easy to manufacture. The filter is useful for example to improve the performance of image sensing apparatus such as television cameras, electronic still and movie cameras, or film video players having color image sensors with different sampling frequencies for different colors.

I claim:

1. An optical spatial frequency filter comprising; at least one pair of birefrigent elements for separating a ray of unpolarized white light into three or more spaced apart rays of light and means for changing the polarization state of light between the birefrigent elements, wherein the means for changing the polarization state of light changes the polarization state of light of a first color by a first amount, and changes the polarization state of light of a second color by a second amount different from the first amount such that light of said first color is split into a first subset of one or more of said rays, separated by a first distance in a given direction, and light of said second color is split into a second subset of two or more of said rays, separated by a second distance larger than said first distance in said given direction, whereby the spatial frequency response of the spatial frequency filter is color dependent and higher for said first color than for said second color.

2. The invention claimed in claim 1, further characterized by the spatial frequency response to different colors being different in two orthogonal directions.

3. The invention claimed in claim 1, wherein the means for changing the polarization state of light is a wave plate comprising a full wave plate for light of said first color.

4. The invention claimed in claim 1, wherein the means for changing the polarization state of light is a wave plate comprising a half-wave plate for light of said first color.

5. The invention claimed in claim 1, wherein the means for changing the polarization state of light comprises optically active material for rotating the polarization state of light of said first color by 180°.

6. A color image sensor and spatial frequency filter combination comprising:
  a color image sensor having a high sampling frequency for a first color of light and a low sampling frequency for a second color of light in a given direction; and
  a spatial frequency filter comprising at least one pair of birefrigent elements for separating a ray of unpolarized light into three or more spaced apart rays of light and means for changing the polarization state of light between the birefringent elements, wherein the means for changing the polarization state of light changes the polarization state of light of the first color of light by a first amount and changes the polarization state of light of the second color by a second amount different from the first amount such that light of said first color is split into a first subset of one or more of said rays separated by a first distance in said given direction, and light of said second color is split into a second subset of two or more of said rays, separated by a second distance, greater than said first, whereby the spatial frequency response of the spatial frequency filter is color dependent, the spatial frequency response to the first color being high, and the spatial frequency response to the second color being low.

7. The invention claimed in claim 6, wherein the color sampling frequency of the image sensor is different in two orthogonal directions, and the color dependent spatial frequency response of the spatial frequency filter is correspondingly different in the two directions.

8. The invention claimed in claim 6, wherein said means for changing the polarization state of light is a wave plate comprising a full wave plate for light of said first color.

9. The invention claimed in claim 6, wherein said means for changing the polarization state of light is a wave plate comprising a half wave plate for light of said first color.

10. The invention claimed in claim 6, wherein the means for changing the polarization state of light comprises optically active material for rotating the polarization of light of said first color by 180°.

* * * * *